United States Patent
Eriksson et al.

(10) Patent No.: US 10,674,329 B2
(45) Date of Patent: Jun. 2, 2020

(54) METHOD AND APPARATUS FOR MAINTAINING UP SESSION STATUS INFORMATION IN AN EDGE CLOUD

(71) Applicant: TELEFONAKTIEBOLAGET LM ERICSSON (PUBL), Stockholm (SE)

(72) Inventors: Hans Eriksson, Sollentuna (SE); Lars Westberg, Huddinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/331,567

(22) PCT Filed: Oct. 7, 2016

(86) PCT No.: PCT/SE2016/050964
§ 371 (c)(1),
(2) Date: Mar. 8, 2019

(87) PCT Pub. No.: WO2018/067049
PCT Pub. Date: Apr. 12, 2018

(65) Prior Publication Data
US 2019/0215665 A1 Jul. 11, 2019

(51) Int. Cl.
*H04W 4/24* (2018.01)
*H04W 8/20* (2009.01)
(Continued)

(52) U.S. Cl.
CPC .............. *H04W 4/24* (2013.01); *H04L 63/30* (2013.01); *H04W 8/08* (2013.01); *H04W 8/20* (2013.01);
(Continued)

(58) Field of Classification Search
CPC ... H04W 4/24; H04W 36/11; H04W 36/0033; H04W 8/08; H04W 8/20; H04L 63/30
(Continued)

(56) References Cited

U.S. PATENT DOCUMENTS

| | | | |
|---|---|---|---|
| 8,243,679 B1* | 8/2012 | Huang | H04W 36/30 370/331 |
| 2015/0208291 A1* | 7/2015 | Lee | H04W 36/0011 370/331 |

(Continued)

FOREIGN PATENT DOCUMENTS

WO    2016134772 A1    9/2016

OTHER PUBLICATIONS

International Search Report and Written Opinion, dated May 23, 2017, from corresponding/related PCT Application No. PCT/SE2016/050964.

(Continued)

*Primary Examiner* — Congvan Tran
(74) *Attorney, Agent, or Firm* — Patent Portfolio Builders PLLC

(57) ABSTRACT

Methods and apparatuses maintain user-plane session status information of user equipment in an edge cloud. Upon determining that a handover of UE at a network edge has occurred, a status-information-acquisition mechanism is added to a handover signaling chain. The status-information-acquisition mechanism triggers providing UP session status information of the UE to a target gateway, which intermediates traffic between the target base station and a network device outside the edge cloud. The UP session status information of the UE is then used by the target gateway to determine UE-related data to be reported to the network device for execution of a function such as legal interception or charging.

23 Claims, 16 Drawing Sheets

(51) Int. Cl.
  *H04W 36/00* (2009.01)
  *H04W 36/12* (2009.01)
  *H04L 29/06* (2006.01)
  *H04W 8/08* (2009.01)
(52) U.S. Cl.
  CPC ....... *H04W 36/0033* (2013.01); *H04W 36/12* (2013.01)
(58) Field of Classification Search
  USPC .......... 455/436–439, 442–444; 370/331–332
  See application file for complete search history.

(56) References Cited

U.S. PATENT DOCUMENTS

2016/0021580 A1* 1/2016 Mufti ................ H04W 36/0022 370/221
2016/0112896 A1* 4/2016 Karampatsis ..... H04W 28/0252 370/230.1
2016/0262069 A1* 9/2016 Parsay ................ H04W 36/165
2016/0360458 A1* 12/2016 Lubenski .............. H04W 76/22
2017/0251405 A1* 8/2017 Stojanovski .......... H04W 8/082

OTHER PUBLICATIONS

Mobile-Edge Computing, "Mobile-Edge Computing—Introductory Technical White Paper", Sep. 2014, Issue 1, pp. 1-35.

NEC, "Session management with flexible UP GW(s) assignment", SA WG2 Meeting #116, Jul. 11-15, 2016, Wien, Austria, S2-163937, pp. 1-5.

Vodafone, "Impact on Lawful Interception of Mobile Edge Computing", 3GPP TSG SA3-LI Meeting #55, Oct. 28-30, 2014, Portland, USA, SA3L14-167.

3rd Generation Partnership Project (3GPP); "Technical Specification Group Services and System Aspects; General Packet Radio Service (GPRS) enhancements for Evolved Universal Terrestrial Radio Access Network (E-UTRAN) access" (Release 14); Jun. 2016; 374 pages.

* cited by examiner

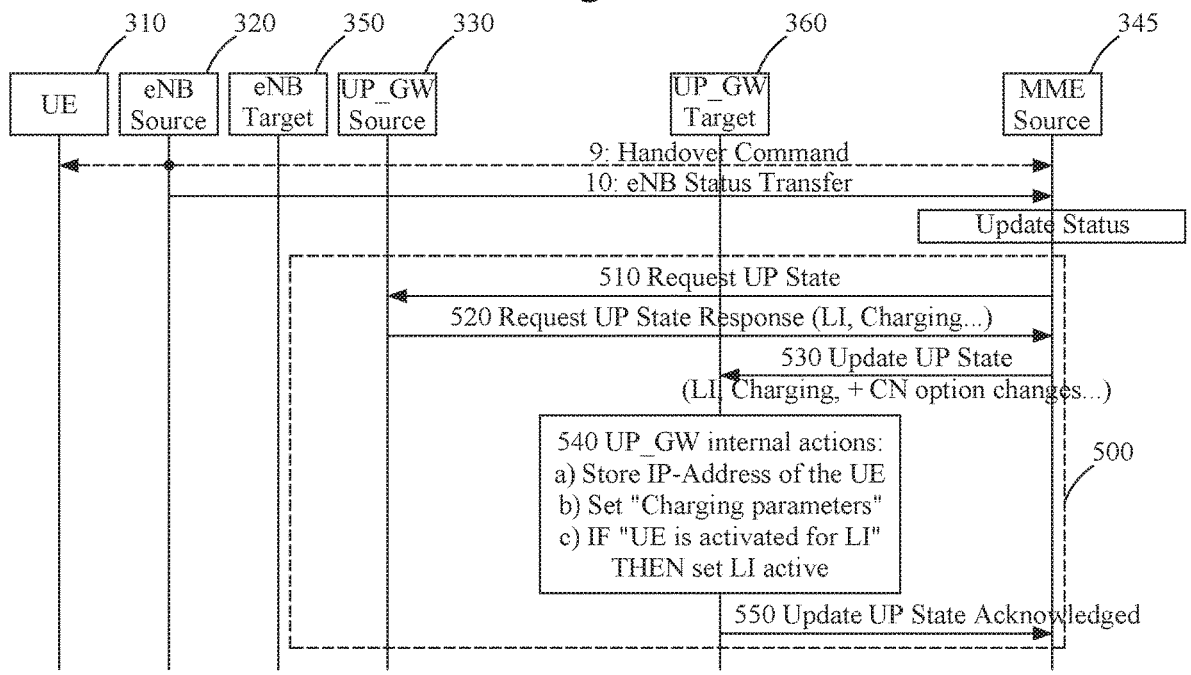
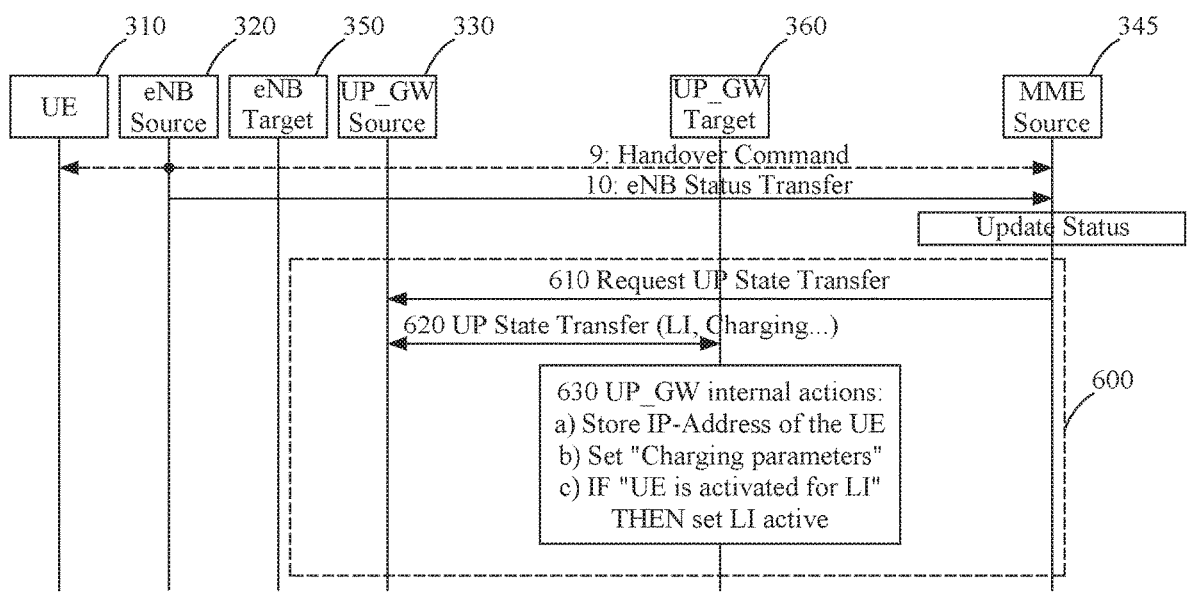

METHOD AND APPARATUS FOR MAINTAINING UP SESSION STATUS INFORMATION IN AN EDGE CLOUD

TECHNICAL FIELD

Embodiments of the subject matter disclosed herein generally relate to methods and apparatuses for locally maintaining user-plane (UP) session status information needed to supply data to core-executed functions relative to a user at the cloud edge.

BACKGROUND

Edge computing is a technology emerging with the ongoing evolution of mobile networks into 5G ($5^{th}$ generation wireless mobile network standards). Edge computing relates to placing processing and storage capabilities (referred to as the "cloud") closer to the user equipment (UE) in a mobile network. The edge cloud enables locally running different types of user and system services, thereby decreasing latency and volume of data transferred across the network. Applications deployed locally (i.e., executed in the edge cloud for users connected at the network edge) run faster and have higher throughput than when the service endpoint is in the core network or on the Internet.

Legal interception (LI) and charging functions run in the network core but use local data, and thus must have support within the edge cloud. The interfaces to LI/charging functions are defined in 3GPP ($3^{rd}$ Generation Partnership Project), a known group of standards documentation. Traffic to/from UE connected to the edge cloud may be copied and forwarded to the network device that performs LI. Information related to the UE's activity (known as logs) is provided to the charging function to enable it to generate billing information.

In current systems, LI and charging functions operate in the user-plane part of a PGW, per client, using a state record for the client using UE. Note that a client has a network subscription and accesses the network using his credentials via UE (i.e., the physical device). UE as a physical device may be used by different clients. However, since often a single client may use UE, the term "UE" and the terms "client" or "user" in this document mean a network subscriber using the physical device to log into the network, uniquely identified by the network core. The state records of clients are stored in state tables, which are updated to reflect the actual state.

Meaning of some standard notation used in this document are listed below:
APP Application
CP Control Plane
eNB evolved Node B
GW Gateway
HSS Home Subscriber Server
LTE Long Term Evolution ($4^{th}$ generation wireless mobile network standards)
OCS Online Charging System
OFCS Offline Charging System
MME Mobility Management Entity
PDN Packet Data Network
PGW PDN Gateway
SGW Serving Gateway
UP User Plane In order to improve scaling of the user-plane/control-plane, the PGW is may be implemented as a split user-plane/control-plane architecture as exemplary illustrated in FIG. 1.

UE 110 accesses the network via base station 120, and uses various applications executed in the edge cloud, via user-plane gateway (UP-GW) 130. Traffic break-out (TBO) function 140 splits user-plane traffic (represented by a continuous line) into edge traffic and traffic to the network core. Dashed lines in FIG. 1 represent control-plane traffic, for example, from base station 120 to MME 150. The UP session status information, which corresponds to content of the state tables, enables UP-GW 130 to decide whether and what type of information to forward for LI/charging function execution.

SGW 155 and PGW 160 are divided into user-plane and control-plane architecture. The LI/charging functions are part of the PGW functionality. PGW 160 executes the LI and charging functions for UE 110. If a UE is target of legal interception, then PGW 160 supplies the summoned information to the legal interception system 170. The control-plane part of PGW 160 controls UP-GW 130, and is able to operate as a centralized controller for many UP-GWs that may be placed at different sites. Various other functional blocks and interfaces marked in FIG. 1 are described in 3GPP standards documentation and are, therefore, not detailed here.

Thus, the LI and charging functions are partly user-plane and partly control-plane functions. The LI function targeting a user triggers user-plane copying of packets of the targeted user, which are then sent from the edge site to the network core with appended header information for further analysis. The charging function may be a bucket-charging type, which requires counting bytes of the passing packets to produce a log that is sent over the charging interfaces to the billing system.

From a location perspective as illustrated in FIG. 2, TBO, UP-GW and edge computing resources may be placed on a hub 200, which is physically close to plural cells 210, at a network edge site. Note however that other cells 212 and 214 adjacent to cells 210 may be served connected to other hubs or even with other instances of the core network. Functions executed at the core-network site 220 communicate with the hub via S1-type interfaces in the control-plane (CP) and the user-plane (UP) respectively (i.e., S1-UP and S1-CP). The cell-sites (i.e., sites where antenna is placed) may be simple base-station-only sites or hub-sites. The hub-site usually includes base station and transmission aggregation functionality concentrating the backhaul transmission to several base stations providing edge computing for plural base stations. Thus, besides base station functionality, the hub may include router/switching for transport aggregation functionality, TBOs, cloud platform and core-network functions.

As already mentioned, execution of the LI/charging function is based on a per-client state recorded by the state records and reflected as UP session status information of an edge-connected user in the UP-GW. This information indicates the appropriate treatment of users' packets passing through a node. Currently, this state is statically configured by the management interfaces of the LI/charging function, with no mobility impacting the UE status information's storage location.

A problem with LI and charging functionality in the edge cloud is that a mobile UE often changes the serving base station, triggering a handover process between base stations. The PGW, which is fixed, provides a central anchor for the LI/charging functions, but the UP-GW may be changed (e.g., another UP-GW for one of cells 212 or 214). In order to properly process user's packets, the UE's status information has to be relocated on a new UP-GW when UP-GW is changed during the handover. Importing such UE status information from the network core does not reliably ensure continuity of the LI and charging functions.

Therefore, it is desirable to develop techniques for effectively maintaining the status information at the edge, with the status information being used to determine UE-related data to be forwarded to the network core for execution of LI and charging functions.

SUMMARY

In order to maintain UE status information at the edge, conventional X2 and S1 handover signaling chains are modified by appending a status-information-acquisition mechanism. These mechanisms ensure that the UE's UP session status information is provided to a target gateway intermediating traffic between the new base station and a network core device. The mechanisms operate mostly locally or without additional communications between the edge and the core, thereby ensuring that the core-executed LI and/or charging function are not interrupted due to the handover.

According to an embodiment, there is a method for maintaining UP session status information of a UE in an edge cloud. The method includes determining that a handover of the UE has occurred, the UE having been served by a source base station before the handover, and being served by a target base station after the handover. The source base station and the target base station are located at an edge site. The method further includes adding a status-information-acquisition mechanism to a handover signaling chain, to trigger providing up session status information of the UE to a target gateway, which intermediates traffic between the target base station and at least one network device outside the edge cloud. The UP session status information of the UE is then used by the target gateway to determine UE-related data to be reported to the at least one network device for execution of at least one function.

According to another embodiment there is an apparatus including an interface and a data processing unit. The interface is configured to receive and transmit messages related to a handover signaling chain involving a source base station and a target base station, which serve the UE before and after a handover, respectively, and at least one network device outside the edge cloud. The data processing unit is configured to determine that the handover of the UE has occurred, and to initiate an status-information-acquisition mechanism inserted in the handover signaling chain to trigger obtaining UP session status information of the UE at a target gateway. The UP session status information of the UE is then used by the target gateway to determine UE-related data to be reported to the at least one network device for execution of at least one function.

According to yet another embodiment, there is a network apparatus configured to maintain UP session status information in an edge cloud. The apparatus includes a communication module configured to receive and transmit messages related to a handover signaling chain involving a source base station and a target base station, which serve an UE before and after a handover, respectively, and at least one network device outside the edge cloud. Apparatus further includes a handover detection module configured to determine that the handover of the UE has occurred, and an UP session status information maintenance module configured to initiate an status-information-acquisition mechanism inserted in the handover signaling chain, to trigger obtaining UP session status information of the UE at a target gateway intermediating traffic between the target base station and the at least one network device. The UP session status information of the UE is then used by the target gateway to determine UE-related data to be reported to the at least one network device for execution of at least one function.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 is an embodiment of a status-information-acquisition mechanism related to the handover signaling chain in FIG. 4, according to an embodiment;
FIG. 6 is another embodiment of a status-information-acquisition mechanism related to the handover signaling chain in FIG. 4.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

UP session status information (USSI) of UE is information used in the edge cloud to determine UE-related data to be reported for execution of a function at another location. An example of such a function is the LI function or the charging function executed in the network core, at a central location. Although the following description focuses on LI and charging functions, these techniques may be applied for other distributed functions.

The USSI may indicate simply an ON/OFF state for the LI. However, the LI header may provide other information such as LI target, correlation number, a time stamp, direction, the target location, etc. The USSI for the charging function may be more complex to include various charging parameters according to which the log for the UE is generated. In order to maintain the USSI for UE connected to the edge cloud when a handover of the UE occurs, a status-information-acquisition (SIA) mechanism is added to a handover signaling chain. The following embodiments illustrate implementation of such mechanisms for handover based on S1 and for handover based on X2 (well-known interfaces described in LTE documentation). The starting point (i.e., before adding the SIA mechanism) are the signaling chains described in 3GPP TS 23.401 version 14.0.0 of June 2016.

Figure 3:
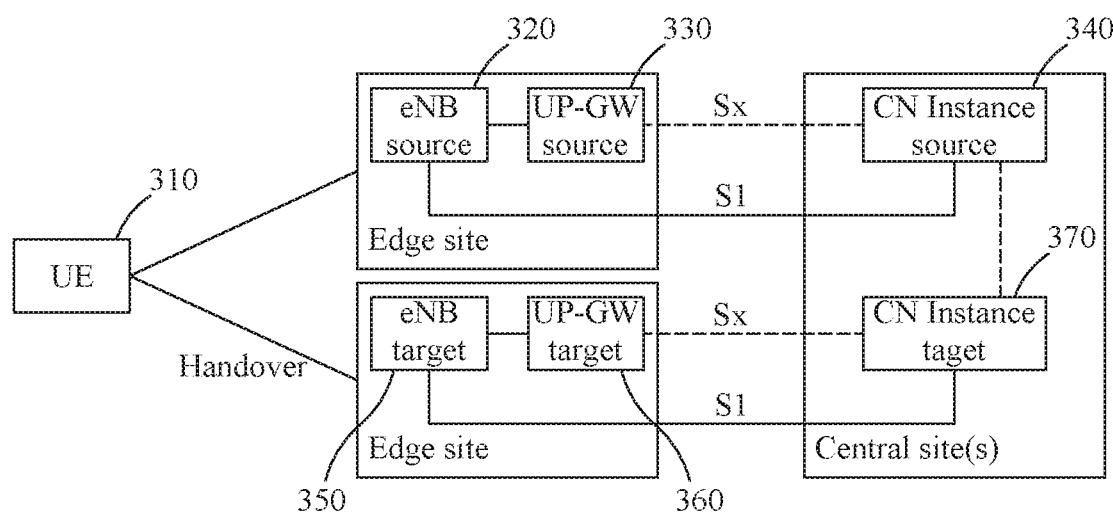
FIG. 3 illustrates an S1 handover scenario.

FIG. 3 illustrates an S1 handover scenario. Before the handover, UE 310 is served by source base station 320, which communicates via source gateway 330 with source core network (CN) instance 340. After the handover, UE 310 is served by target base station 350, which communicates via target gateway 360 with target CN instance 370. The base stations and the gateways in FIG. 3 are located at an edge site, while the CN instances and devices are at a central site. The "central" qualifier applied to the site means a different location more distant from the UE than the edge site. Gateways are configured to intermediate traffic between base stations at the network edge and core-network devices. The gateways probe UE traffic and generate logs for the LI and charging functions. In other words, the gateway hosts an edge-side part of a distributed LI/charging function and supplies UE-related data to a central part of the distributed function.

Figure 4:
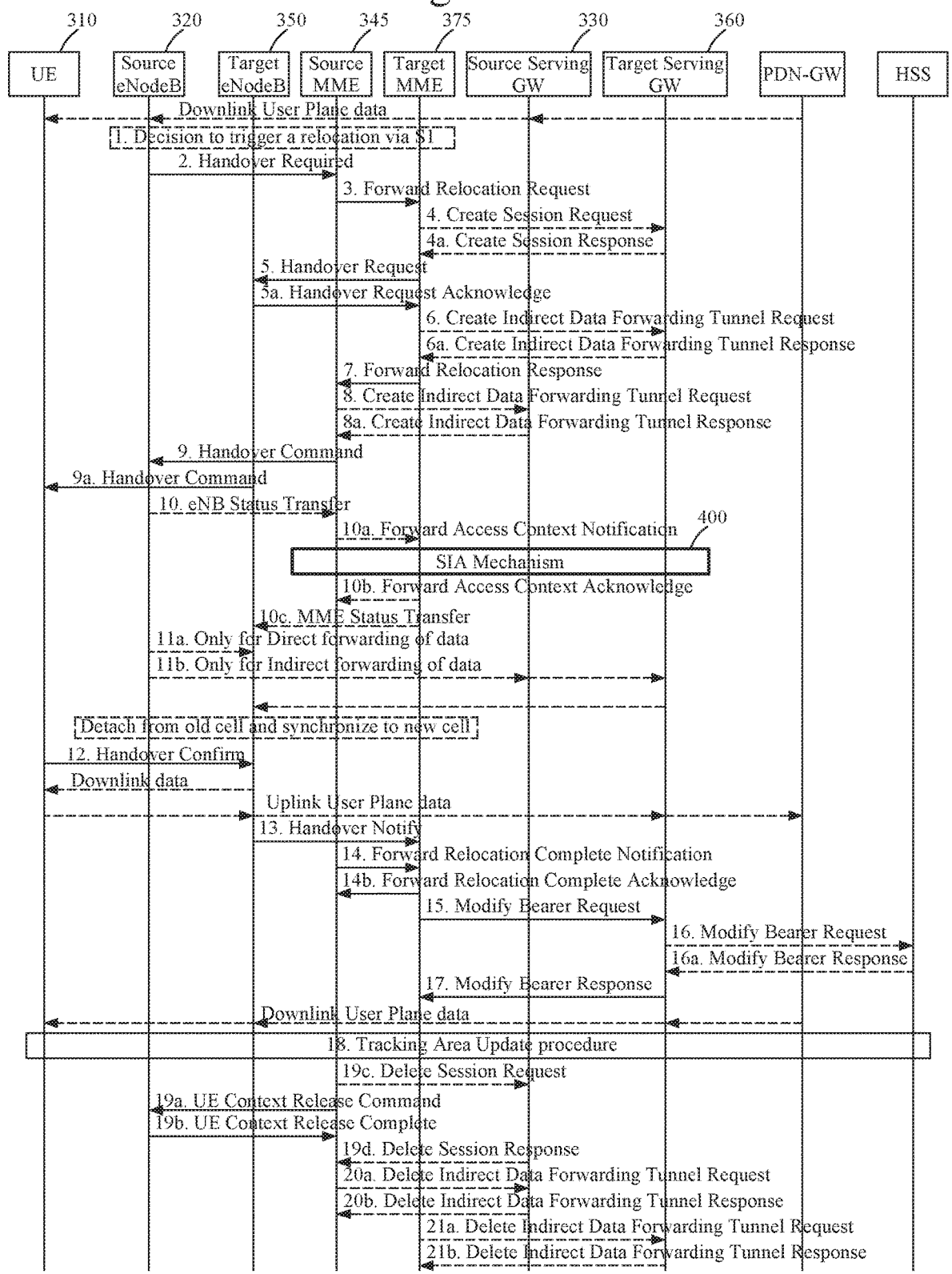
FIG. 4 illustrates a handover signaling chain for the scenario in FIG. 3, according to an embodiment.

The handover signaling chain for the S1 handover scenario in FIG. 3 is illustrated in FIG. 4. This handover signaling chain includes messages exchanged between the source and the target base stations, the source and the target gateways, as well as the source and the target mobility management entities (MMEs) 345 and 375, which are parts of the source and target CN instances 340 and 370 (which may be located at different sites). MME may conform to the definitions in current 3GPP technical documents, but it is not limited to these definitions. MME in this document is a function handling the mobility management and session management functions for a UE.

In this embodiment, upon receiving message 10 related to the access context modification, target MME 375 verifies whether a gateway different from the source gateway will be employed for UE 310 after the handover. If indeed a target gateway different from the source gateway will be employed after the handover, then target MME 375 triggers SIA mechanism 400 to update the USSI.

According to an embodiment of this SIA illustrated in FIG. 5, SIA mechanism 500 includes source MME 345 retrieving the USSI of UE 310 from source gateway 330 at 510 and 520, and providing the retrieved USSI to target gateway 360 at 530. Upon receiving the USSI, target gateway 360 may take the appropriate internal actions listed at 540 (i.e., storing the IP address of UE 310, setting the UE charging parameters and the indication of whether the LI function is active for UE 310). Target gateway 360 may then send an acknowledgement to source MME 345 at 550, to continue the handover signal chain as shown in FIG. 4.

According to another embodiment of the SIA illustrated in FIG. 6, SIA mechanism 600 includes source MME 345 requesting source gateway 330 to transfer the USSI of UE 310 to target gateway 360 at 610. In response to this request, source gateway 330 transfers the USSI to target gateway 360 at 620. Upon receiving the USSI, target gateway 360 may take the appropriate internal actions listed at 630 (i.e., storing the IP address of UE 310, setting the UE charging parameters and the indication of whether the LI function is active for UE 310).

Figure 7:
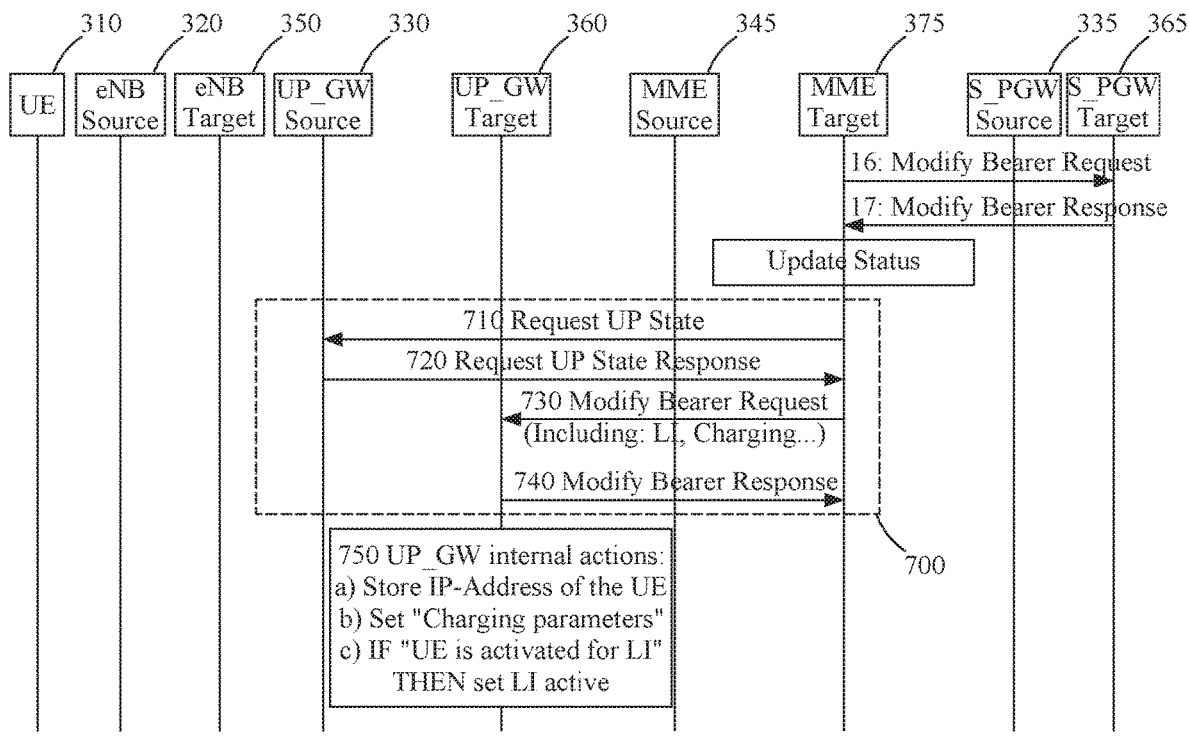
FIG. 7 is yet another embodiment of a status-information-acquisition mechanism related to the handover signaling chain in FIG. 4.

FIG. 7 illustrates an alternative embodiment in which target MME 375 triggers SIA mechanism 700 combined with and at the moment when bearer modification is signaled. Thus, upon determining that a gateway different from the source gateway will be employed for UE 310 after the handover, target MME 375 retrieves the USSI of the UE from the source gateway 330 at 710 and 720. MME 375 then provides the retrieved USSI of the UE to target gateway 360 in combination with a modify-bearer request, at 730. Target gateway 360 responds to the request at 740. Upon receiving the USSI, target gateway 360 may take the appropriate internal actions listed at 750 (i.e., storing the IP address of UE 310, setting the UE charging parameters and the indication of whether the legal interception function is active for UE 310).

Figure 8:
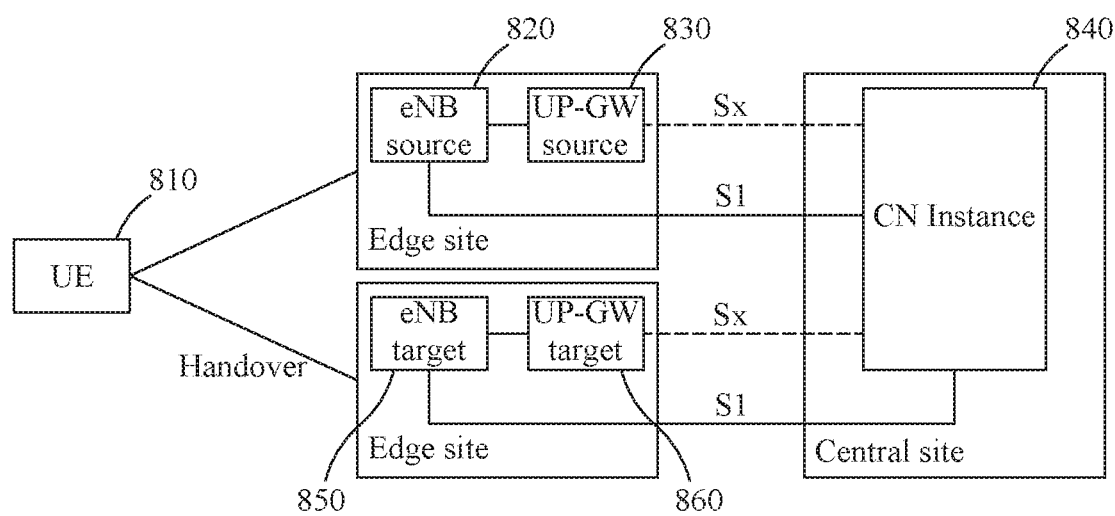
FIG. 8 illustrates another S1 handover scenario.

FIG. 8 illustrates another S1 handover scenario. Before the handover, UE 810 is served by source base station 820, which communicates via source gateway 830 with CN 840. After the handover, UE 810 is served by target base station 850, which communicates via target gateway 860 with the same CN 840. The base stations and the gateways in FIG. 8 are located at an edge site, while CN 840 is at a central site.

Figure 9:
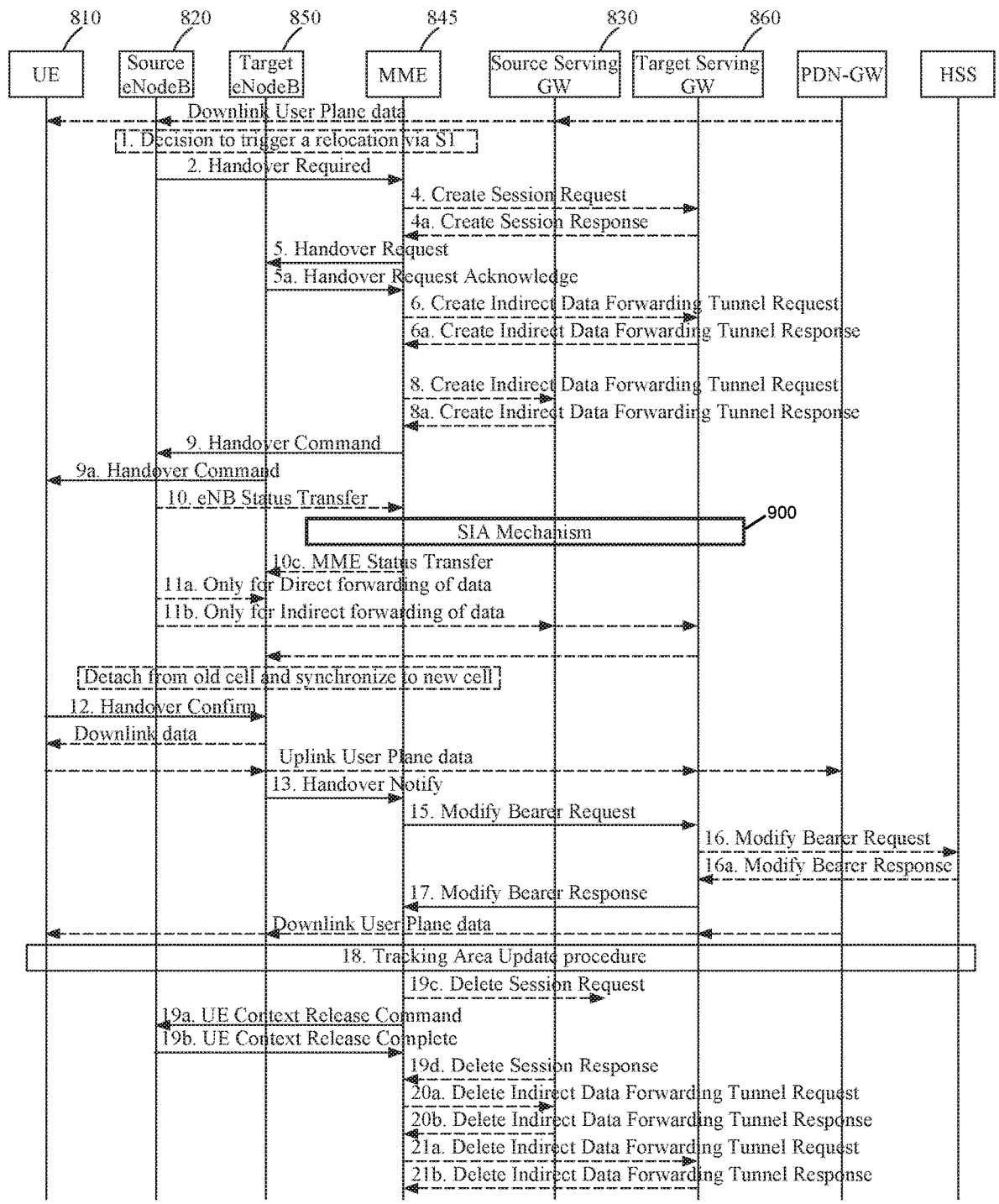
FIG. 9 illustrates a handover signaling chain for the scenario in FIG. 8, according to another embodiment.

The handover signaling chain for the S1 handover scenario in FIG. 8 is illustrated in FIG. 9. In this embodiment, upon receiving source base station status transfer to MME 845 of CN 840 triggers SIA mechanism 900 to update USSI if a target gateway different from the source gateway will be employed after the handover.

Figure 10:
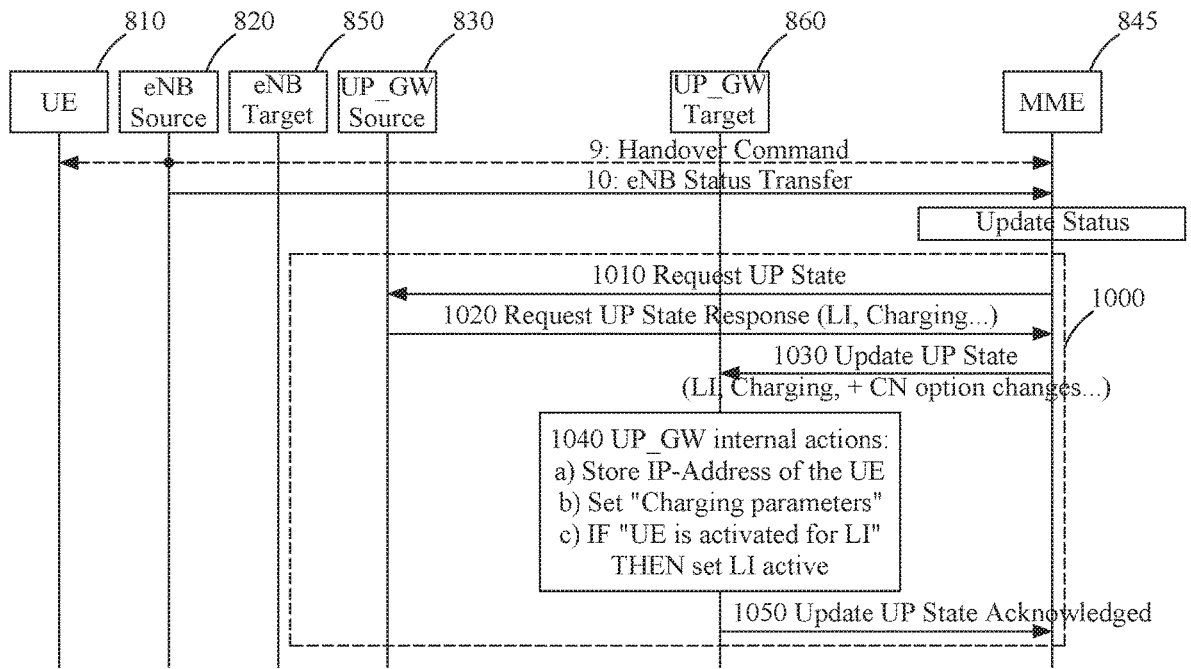
FIG. 10 is an embodiment of a status-information-acquisition mechanism related to the handover signaling chain in FIG. 9.

According to an embodiment of this SIA illustrated in FIG. 10, SIA mechanism 1000 includes source MME 845 retrieving the USSI of UE 810 from source gateway 830 at 1010 and 1020, and providing the retrieved USSI to target gateway 860 at 1030. Upon receiving the USSI, target gateway 860 may store the IP address of UE 810, set the UE charging parameters and the indication of whether the legal interception function is active for UE 810, at 1040. Target gateway 660 may then send an acknowledgement to source MME 845 at 1050 to then continue the handover signal chain as shown in FIG. 9.

Figure 11:
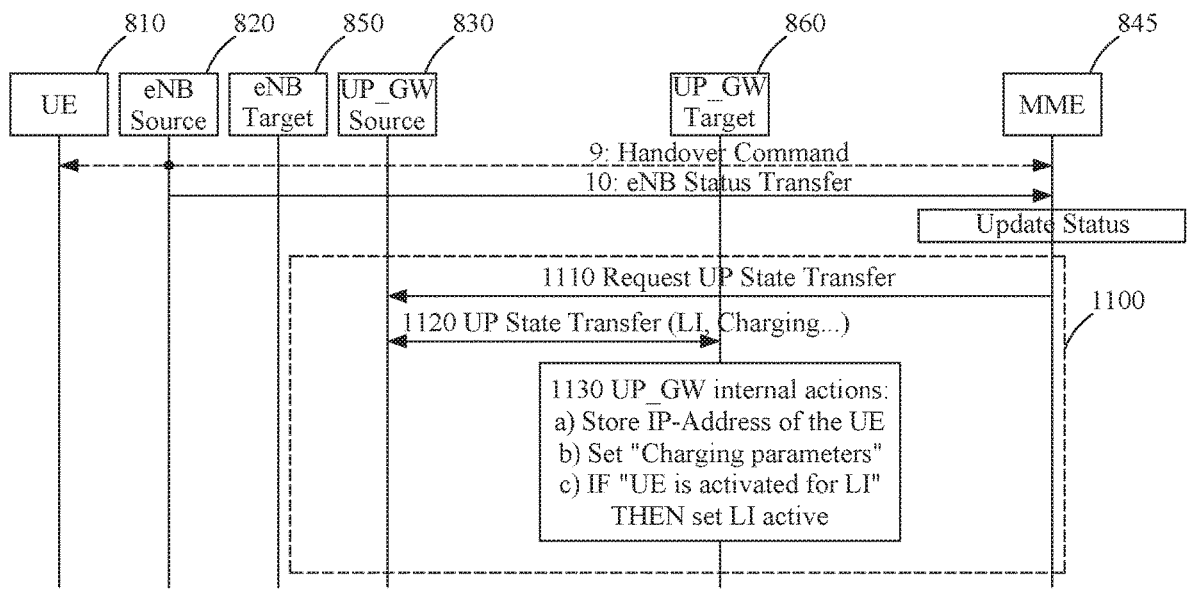
FIG. 11 is another embodiment of a status-information-acquisition mechanism related to the handover signaling chain in FIG. 9.

According to another embodiment of the SIA illustrated in FIG. 11, SIA mechanism 1100 includes source MME 845 requesting source gateway 830 to transfer the USSI of UE 810 to target gateway 860 at 1110. In response to this request, source gateway 830 transfers the USSI to target gateway 860 at 1120. Upon receiving the USSI, target gateway 860 will then store the IP address of UE 810, set the UE charging parameters and the indication of whether the LI function is active for UE 810 at 1130.

Figure 12:
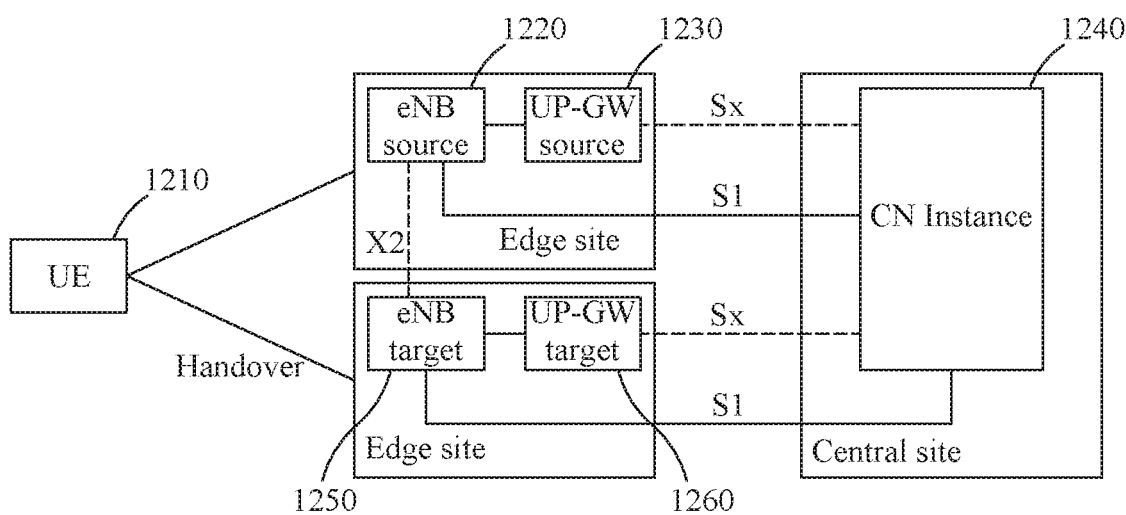
FIG. 12 illustrates an X2 handover scenario.

FIG. 12 illustrates an X2 handover scenario. Before the handover, UE 1210 is served by source base station 1220, which communicates via source gateway 1230 with CN 1240. After the handover, UE 1210 is served by target base station 1250, which communicates via target gateway 1260 with CN 1240. Source base station 1220 and target base station 1250 communicate via an X2 interface. The base stations and the gateways in FIG. 12 are located at an edge site, while the CN instance is at a central site.

Figure 13:
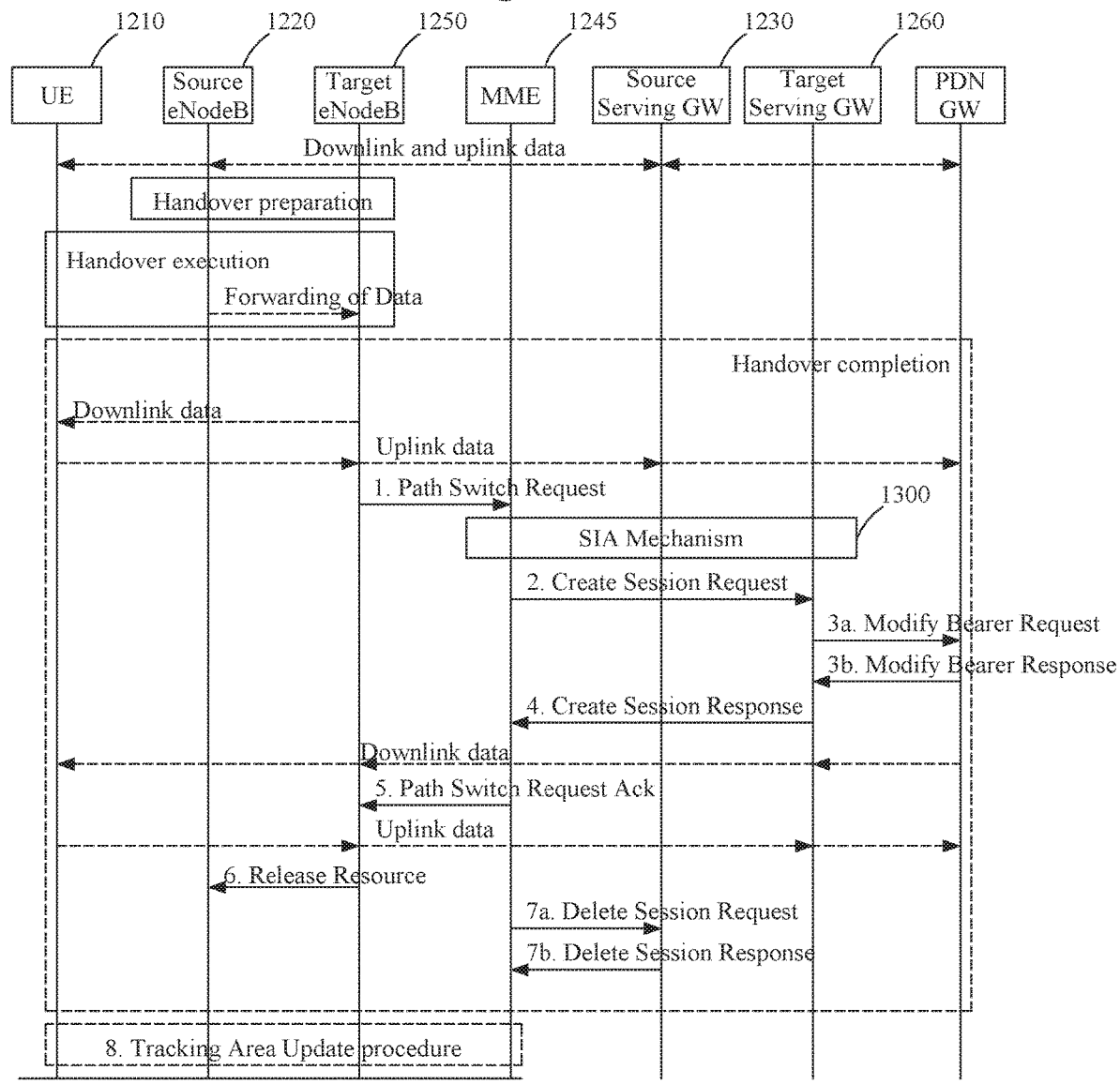
FIG. 13 illustrates a handover signaling chain for the scenario in FIG. 12, according to another embodiment.

The handover signaling chain for the X2 handover scenario in FIG. 12 is illustrated in FIG. 13. The signaling chain is the same and the following remarks remain valid whether or not distinct source and target CN instances are involved. The handover preparation and execution takes place directly between source base station 1220 and target base station 1250 via the X2 interface. During the handover completion, upon receiving a path-switch request, MME 1245 triggers SIA mechanism 1300 to update the USSI of UE 1210 if indeed a target gateway different from the source gateway is employed.

Figure 14:
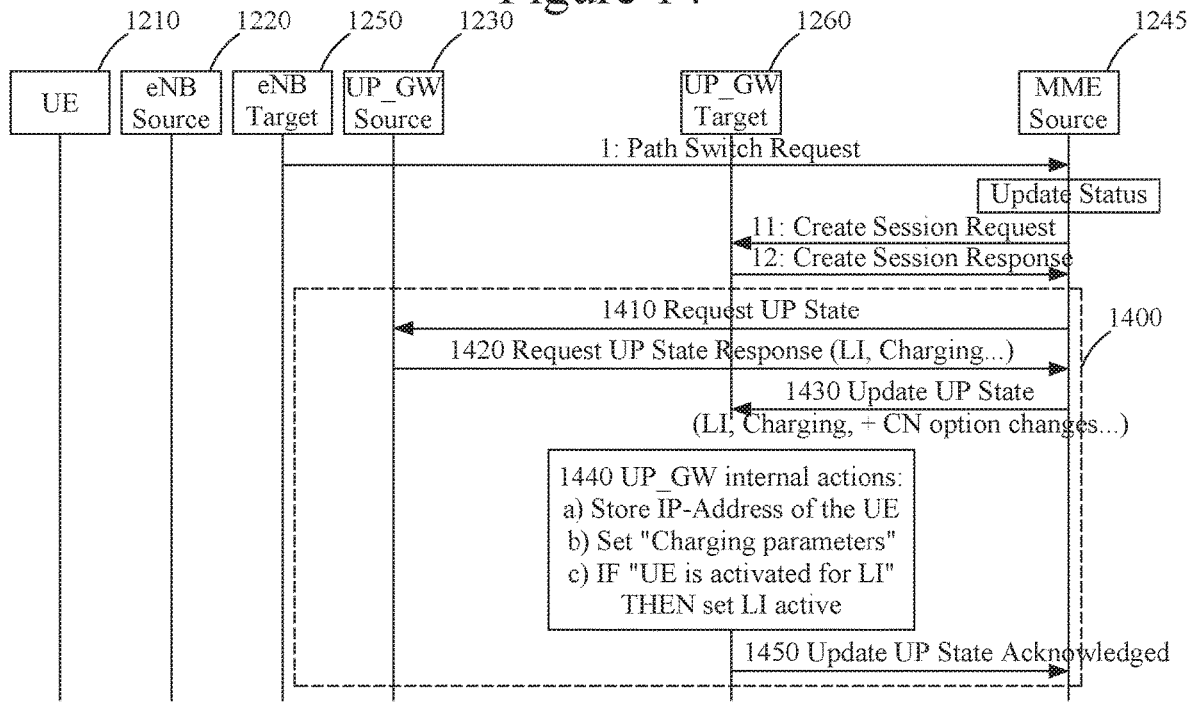
FIG. 14 is an embodiment of a status-information-acquisition mechanism related to the handover signaling chain in FIG. 13.

According to an embodiment of this SIA illustrated in FIG. 14, SIA mechanism 1400 includes MME 1245 retrieving the USSI of UE 1210 from source gateway 1230 at 1410 and 1420, and providing the retrieved USSI to target gateway 1260 at 1430. Upon receiving the USSI, target gateway 1260 may take the appropriate internal actions listed at 1440 (i.e., storing the IP address of UE 1210, setting the UE charging parameters and the indication of whether the LI function is active for UE 1210). Target gateway 1260 may then send an acknowledgement to MME 1245 at 1450 to continue the handover signal chain as shown in FIG. 13.

Figure 15:
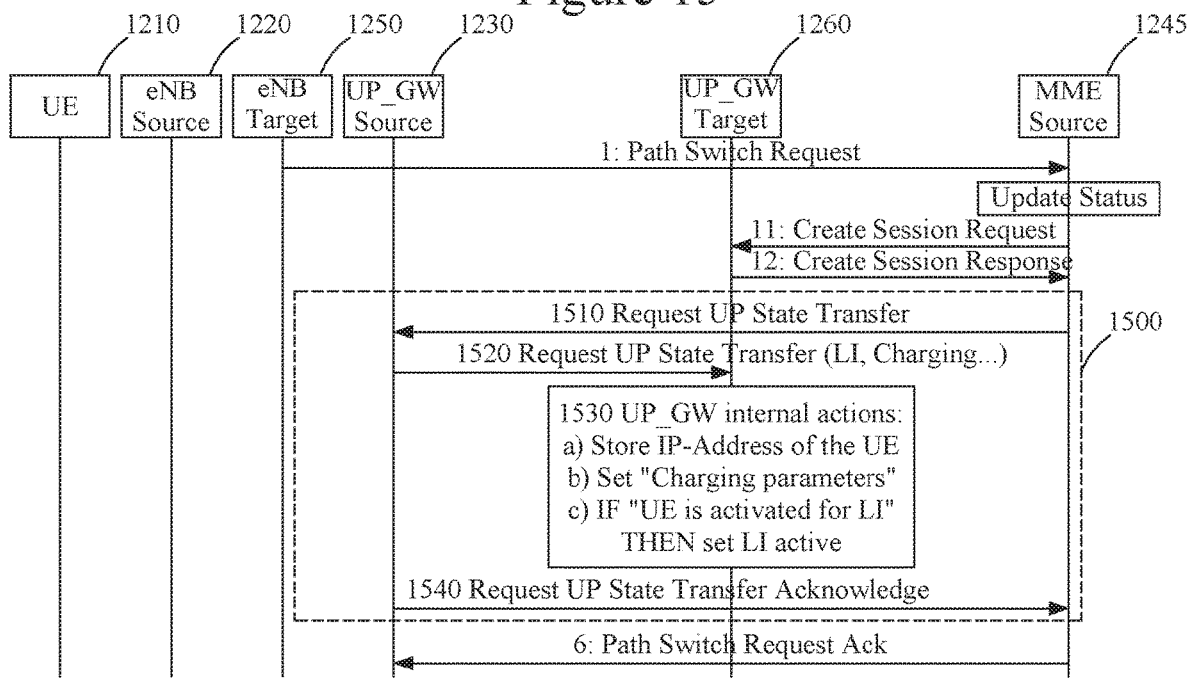
FIG. 15 is another embodiment of a status-information-acquisition mechanism related to the handover signaling chain in FIG. 13.

According to another embodiment of the SIA illustrated in FIG. 15, SIA mechanism 1500 includes MME 1245 requesting source gateway 1230 to transfer the USSI of UE 1210 to target gateway 1260 at 1510. In response to this request, source gateway 1230 transfers the USSI to target gateway 1260 at 1520. Upon receiving the USSI, target gateway 1260 may take the internal actions listed at 1530 (i.e., storing the IP address of UE 1210, setting the UE charging parameters and the indication of whether the LI function is active for UE 1210). Source gateway 1230 may also send to MME 1245 an acknowledgement of the request at 1540.

Figure 16:
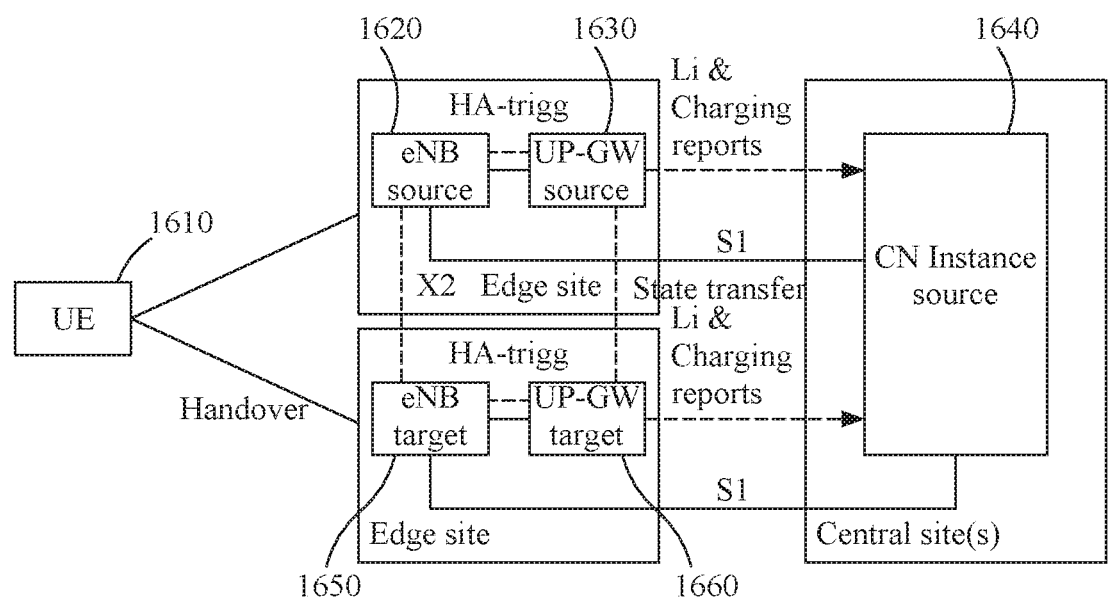
FIG. 16 illustrates an X2 handover scenario with UP_GW stand-alone function.

FIG. 16 illustrates an X2 handover scenario with UP_GW stand-alone function. Before the handover, UE 1610 is served by source base station 1620, which communicates via source gateway 1630 with communication network CN 1640. After the handover, UE 1610 is served by target base station 1650, which communicates via target gateway 1660 with CN 1640. The base stations and the gateways in FIG. 16 are located at an edge site, while the CN is at a central site.

Figure 17:
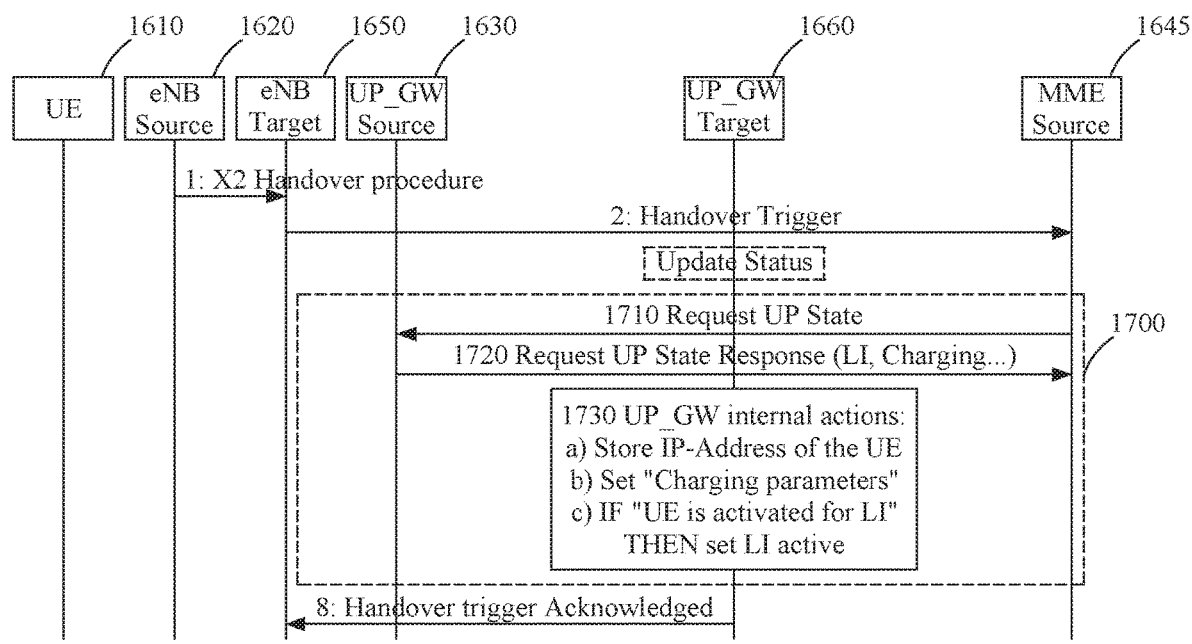
FIG. 17 illustrates a handover signaling chain for the scenario in FIG. 16, according to an embodiment.

The handover signaling chain for the S1 handover scenario in FIG. 16 is illustrated in FIG. 17. After an X2 handover procedure is prepared and executed between source base station 1620 and target base station 1650, target base station 1650 sends a handover trigger to target gateway 1660. The target gateway then determines that the handover has occurred and requests source gateway 1630 to transfer the USSI of UE 1610 at 1710. Upon receiving the USSI from the source gateway 1630 at 1720, target gateway 1660 stores the IP address of UE 1610, and sets its charge parameters and the indication of whether the LI function is active for UE 1610, at 1730. Target gateway 1660 then acknowledges the handover trigger at 1740. In this case, the USSI information is relocated without employing MME 1645.

Figure 18:
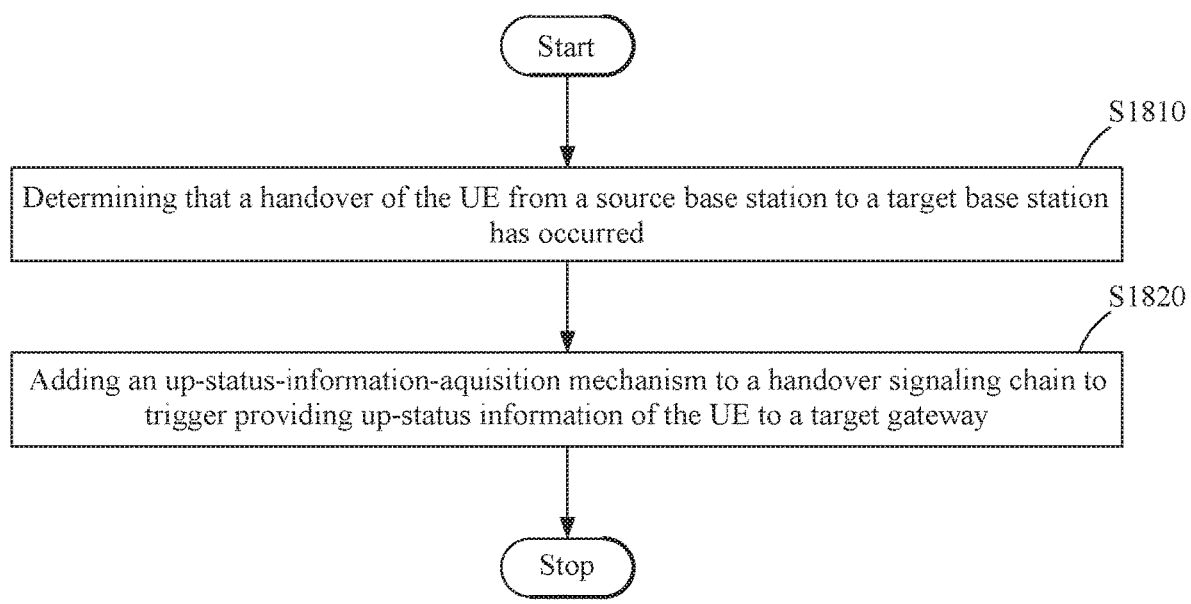
FIG. 18 is a flowchart of a method for maintaining UP session status information of UE in an edge cloud according to an embodiment.

FIG. 18 is a flowchart of a method 1800 for effectively maintaining USSI information of UE connected to an edge cloud. The method is effective in the sense that interruptions in the operation of distributed functions are avoided. Method 1800 includes determining that a handover of the user equipment has occurred. That is, the UE was served by a source base station before the handover, and is served by a target base station after the handover, with the source and target base stations located at an edge site at S1830. Method 1800 further includes adding an SIA mechanism to a handover signaling chain to trigger providing USSI of the UE to a target gateway at 1820. The target gateway intermediates traffic between the target base station and a core network device. The USSI of the UE is then used by the target gateway to determine UE-related data to be reported for execution of at least one function in the network core.

Figure 1:
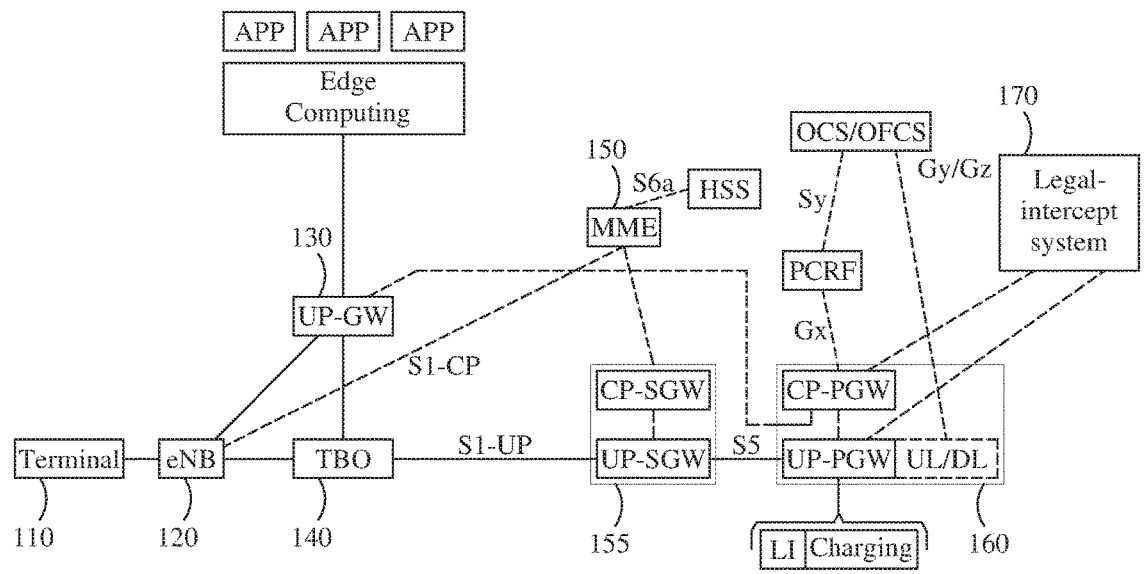
FIG. 1 is a functional system architecture.
Figure 2:
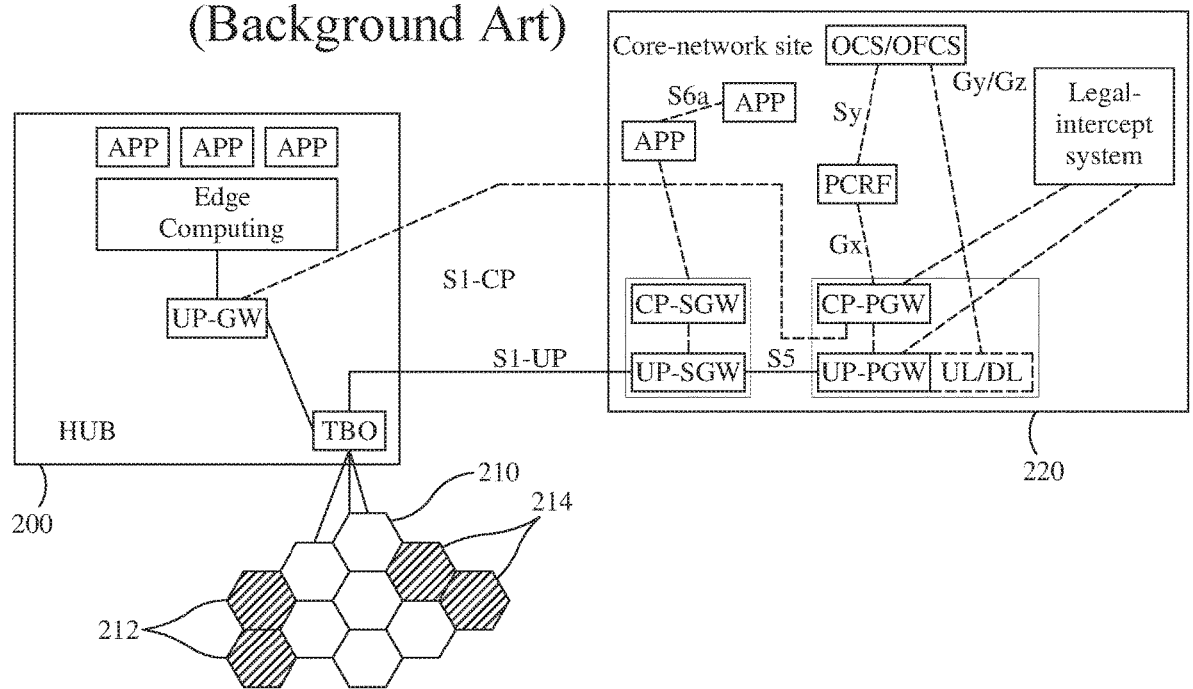
FIG. 2 is illustrates the location of various functions.

Although the above description is based on network functions, it is understood that at each distinct location there is at least one physical device (apparatus) able to perform these functions. Thus, looking now back at FIG. 2, UE and at least some base stations using the edge cloud are at cell-sites distinct from the hub-site hosting the edge cloud's processing and memory resources. The MMEs are also outside the edge cloud. Although a typical deployment would not have the MME executed in the Edge Cloud, having MME executed in one of the Edge clouds is foreseeable.

Figure 19:
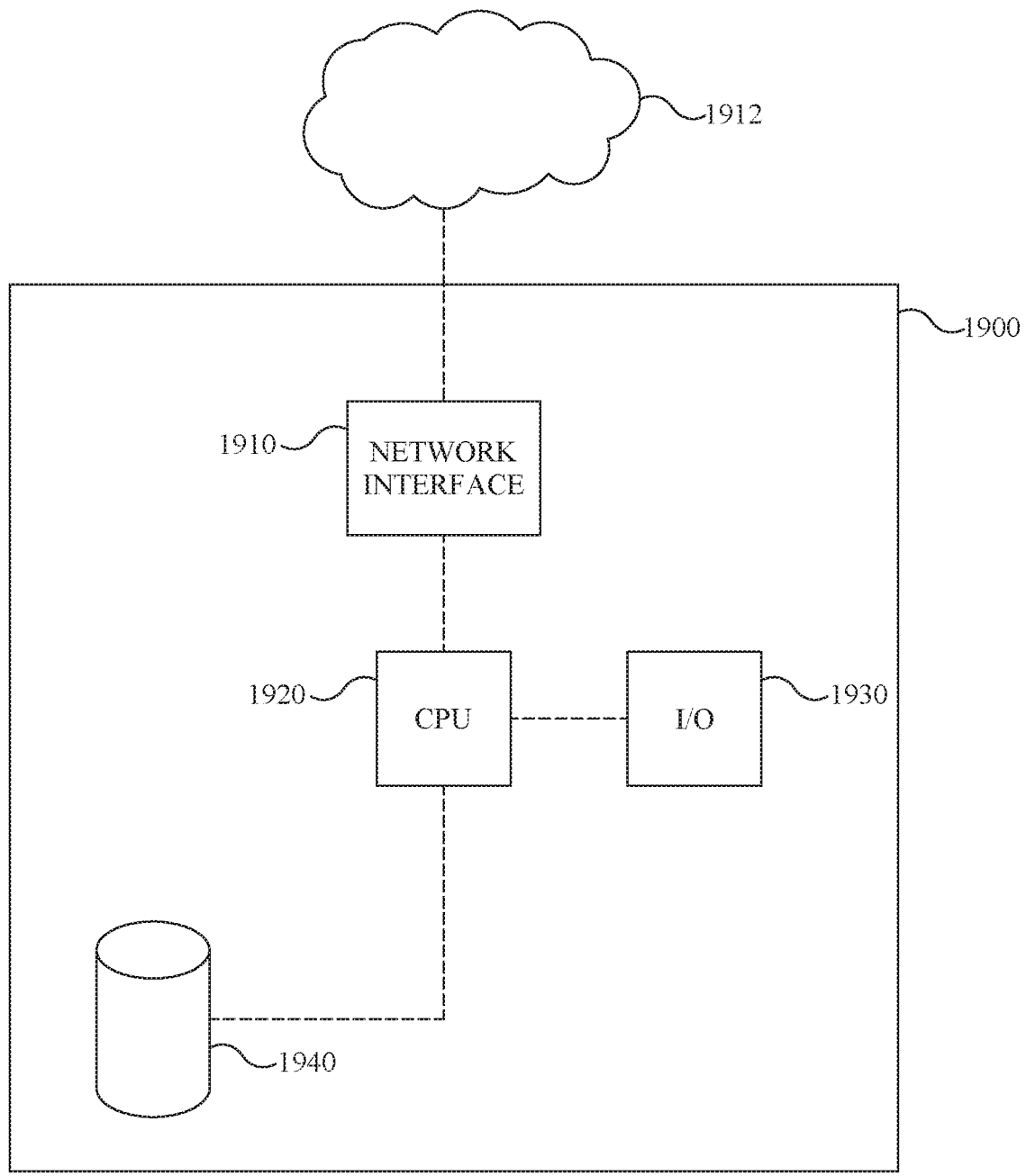
FIG. 19 is a schematic diagram of an apparatus configured to maintain UP session status information of UE in an edge cloud according to an embodiment.

FIG. 19 is a schematic diagram of an apparatus 1900 according to an embodiment. Apparatus 1900 includes a communication interface 1910 and a processing unit 1920. The communication interface is configured to receive and transmit messages related to a handover signaling chain involving a source base station and a target base station, which serve the UE before and after a handover, respectively, and a network device outside the edge cloud. Data processing unit 1920 is configured to determine that the handover of the UE has occurred, and to initiate a status-information-acquisition mechanism inserted in the handover signaling chain to trigger obtaining UP session status information of the UE at a gateway (which uses the UP session status information of the UE to determine UE-related data to be reported to the at least one network device for execution of at least one function after the handover). The data processing unit may also be configured to perform an MME function before or after the handover, and/or to manage UE's traffic.

Apparatus 1900 may also include a memory 1940 and an operator interface 1930. The memory may store executable codes which, when executed by the processing unit, make the processing unit perform any of the methods described in this section.

Figure 20:
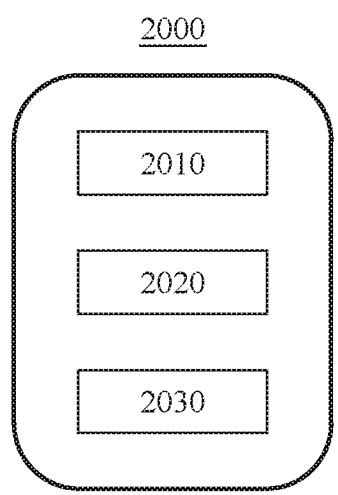
FIG. 20 is a block diagram of an apparatus according to another embodiment.

FIG. 20 is a block diagram of an apparatus 2000 according to another embodiment. Apparatus 2000 includes a communication module 2010 configured to receive and transmit messages related to a handover signaling chain involving a source base station and a target base station, which serve UE before and after a handover, respectively, and at least one network device outside the edge cloud. For example, this module's functionality may be executed by a transceiver.

Apparatus 2000 further includes a handover detection module 2020 configured to determine that the handover of the UE has occurred, and a UP session status information maintenance module 2030 configured to initiate a status-information-mechanism inserted in the handover signaling chain. Modules 2020 and 2030 may be implemented on one or more processors and other electronic circuits.

Thus, by modifying the conventional X2 and S1 handover signaling chains to append a status-information-acquisition mechanism UE status information is maintained at the edge (in a target gateway intermediating traffic between the new base station and a network core device). These mechanisms operate mostly locally, with minimal or no communications between the edge and the core, thereby preventing interruptions or undesirable delays in supplying the data for the LI and/or charging functions.

Thus, the embodiments disclosed in this section provide methods and network devices for maintaining user-plane session status information at a network edge. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for maintaining User Plane, UP, session status information of a user equipment, UE, in an edge cloud, the method comprising:
    determining that a handover of the UE has occurred, the UE having been served by a source base station before the handover, and being served by a target base station after the handover, the source base station and the target base station being located at an edge site; and then
    adding a status-information-acquisition mechanism to a handover signaling chain, to trigger providing UP session status information of the UE to a target gateway, wherein the target gateway intermediates traffic between the target base station and at least one network device outside the edge cloud,
    wherein the UP session status information of the UE is then used by the target gateway to determine UE-related data to be reported to the at least one network device for execution of at least one function.

2. The method of claim 1, wherein the at least one function includes a charging function.

3. The method of claim 1, wherein the at least one function includes a legal-interception function.

4. The method of claim 1, wherein the UE is connected to a source core network instance before the handover and to a target core network instance after the handover, and
    wherein a source MME device determines that the handover of the UE has occurred and initiates the status-information-acquisition mechanism, and the source MME device further performs a mobility function for the UE before the handover.

5. The method of claim 4, wherein the initiation of the status-information-acquisition mechanism further comprises the source MME device retrieving the UP session status information of the UE from a source gateway, and then providing the UP session status information of the UE to the target gateway, and
    before the handover, the source gateway connected to the source base station has been able to use the UP session status information of the UE to generate the UE-related data for the execution of the at least one function.

6. The method of claim 4, wherein the status-information-acquisition mechanism further comprises the source MME device requiring a source gateway to provide the UP session status information of the UE to the target gateway, and
    before the handover, the source gateway connected to the source base station has been able to use the UP session status information of the UE to generate the UE-related data for the at least one function.

7. The method of claim 4, wherein the source MME device associates the status-information-acquisition mechanism with a bearer modification mechanism in the handover signaling chain.

8. The method of claim 1, wherein the UE is connected to a same communication network instance before and after the handover, and
    wherein a target MME device determines the handover of the UE has occurred and initiates the status-information-acquisition mechanism, and the target MME device further performs a mobility function for the UE after the handover.

9. The method of claim 8, wherein the status-information-acquisition mechanism further comprises:
    the target MME device retrieving the UP session status information of the UE from a source gateway,
    the target MME device providing the UP session status information of the UE to the target gateway, and
    before the handover, the source gateway connected to the source base station has been able to use the UP session status information of the UE to generate the UE-related data for the execution of the at least one function.

10. The method of claim 8, wherein the status-information-acquisition mechanism further comprises the target MME device retrieving the UP session status information of the UE from a source gateway, and then providing the UP session status information of the UE to the target gateway, and
    before the handover, the source gateway connected to the source base station has been able to use the UP session status information of the UE to generate the UE-related data for the execution of the at least one function.

11. The method of claim 4, wherein the source MME device determines that the handover has been executed via an X2 interface between the source base station and the target base station upon receiving a request to switch a path via the target base station to the UE in view of the handover.

12. The method of claim 11, wherein the status-information-acquisition mechanism further comprises the source MME device retrieving the UP session status information of the UE from a source gateway, and then providing the UP session status information of the UE to the target gateway, and before the handover, the source gateway connected to the source base station has been able to use the UP session status information of the UE to generate the UE-related data for the execution of the at least one function.

13. The method of claim 11, wherein the status-information-acquisition mechanism further comprises the source MME device requiring a source gateway to provide the UP session status information of the UE to the target gateway, and before the handover, the source gateway connected to the source base station has been able to use the UP session status information of the UE to generate the UE-related data for the execution of the at least one function.

14. The method of claim 1, wherein the target gateway determines that the handover has occurred upon receiving a handover-related communication from the target base station, and initiates the status-information-acquisition mechanism by requesting the UP session status information of the UE from a source gateway that has intermediated traffic between the source base station and the at least one network core device before the handover.

15. The method of claim 1, wherein the handover signaling chain is described in 3GPP TS 23.401 v 14.0.0.

16. A network apparatus configured to maintain User Plane, UP, session status information of a user equipment, UE, in an edge cloud, the apparatus comprising:
an interface configured to receive and transmit messages related to a handover signaling chain involving a source base station and a target base station, which serve the UE before and after a handover, respectively, and at least one network device outside the edge cloud; and
a data processing unit connected to the interface and configured
to determine that the handover of the UE has occurred, and then
to initiate a status-information-acquisition mechanism inserted in the handover signaling chain to trigger obtaining UP session status information of the UE at a target gateway,
wherein the UP session status information of the UE is then used by the target gateway to determine UE-related data to be reported to the at least one network device for execution of at least one function.

17. The apparatus of claim 16, wherein the at least one function includes a charging function and/or a legal interception function.

18. The apparatus of claim 16, wherein the data processing unit is further configured to perform a mobility function for the UE before the handover.

19. The apparatus of claim 16, wherein the data processing unit is further configured to perform a mobility function for the UE after the handover.

20. A network apparatus configured to maintain User Plane, UP, session status information in an edge cloud, the apparatus comprising:
a communication module configured to receive and transmit messages related to a handover signaling chain involving a source base station and a target base station, which serve a user equipment, UE, before and after a handover, respectively, and at least one network device outside the edge cloud;
a handover detection module configured to determine that the handover of the UE has occurred; and
an UP session status information maintenance module configured to initiate an status-information-acquisition mechanism, after the handover of the UE has occurred, wherein the status-information-acquisition mechanism is inserted in the handover signaling chain to trigger obtaining UP session status information of the UE at a target gateway intermediating traffic between the target base station and the at least one network device,
wherein the UP session status information of the UE is then used by the target gateway to determine UE-related data to be reported to the at least one network device for execution of at least one function.

21. The apparatus of claim 20, wherein the at least one function includes a charging function and/or a legal interception function.

22. The apparatus of claim 20, further comprising a mobility management module configured to perform a mobility function for the UE before the handover.

23. The apparatus of claim 20, further comprising a mobility management module configured to perform a mobility function for the UE after the handover.

* * * * *